(12) United States Patent
Bell

(10) Patent No.: US 7,878,558 B1
(45) Date of Patent: Feb. 1, 2011

(54) GATE LATCH

(76) Inventor: William Russell Bell, 594 Turnercrest Rd., Gillette, WY (US) 82718

( * ) Notice: Subject to any disclaimer, the term of this patent is extended or adjusted under 35 U.S.C. 154(b) by 160 days.

(21) Appl. No.: 11/925,612

(22) Filed: Oct. 26, 2007

Related U.S. Application Data

(60) Provisional application No. 60/863,057, filed on Oct. 26, 2006.

(51) Int. Cl.
*E05C 19/06* (2006.01)
*E05B 15/02* (2006.01)

(52) U.S. Cl. .................. 292/80; 292/163; 292/340; 292/341.15; 292/341.17

(58) Field of Classification Search .............. 292/63, 292/80, 216, 340, 341.15, 341.17, 137, 163
See application file for complete search history.

(56) References Cited

U.S. PATENT DOCUMENTS

| | | | | |
|---|---|---|---|---|
| 45,162 | A * | 11/1864 | Last ........................ | 292/81 |
| 429,505 | A * | 6/1890 | Clements .................... | 292/173 |
| 475,922 | A * | 5/1892 | Bernstein .................... | 292/181 |
| 484,752 | A * | 10/1892 | Hoffman .................... | 292/54 |
| 714,954 | A * | 12/1902 | Setbacken ................... | 292/54 |
| 821,363 | A * | 5/1906 | Jackson ..................... | 292/53 |
| 842,046 | A * | 1/1907 | Williams .................... | 292/54 |
| 842,685 | A * | 1/1907 | Mitchell .................... | 292/54 |
| 898,247 | A * | 9/1908 | Mason ....................... | 292/218 |
| 965,238 | A * | 7/1910 | Shoff ........................ | 292/52 |
| 1,052,664 | A * | 2/1913 | Hester ....................... | 292/216 |
| 1,183,575 | A * | 5/1916 | Longenecker ................ | 292/54 |
| 1,200,260 | A * | 10/1916 | Still .......................... | 292/218 |
| 1,289,708 | A * | 12/1918 | Enok ......................... | 292/45 |
| 1,504,992 | A * | 8/1924 | Stewart .................. | 292/341.17 |
| 2,538,398 | A * | 1/1951 | Thompson et al. .......... | 292/173 |
| 2,556,361 | A * | 6/1951 | Coleman .................... | 292/173 |
| 2,693,043 | A * | 11/1954 | Leake ........................ | 49/237 |
| 2,759,752 | A * | 8/1956 | Demings .................... | 292/337 |
| 2,860,903 | A * | 11/1958 | Narancich et al. ........... | 292/48 |
| 3,955,837 | A * | 5/1976 | Christensen ................ | 292/173 |
| 4,135,747 | A | 1/1979 | Melilli | |
| 4,240,278 | A | 12/1980 | Linder | |

(Continued)

FOREIGN PATENT DOCUMENTS

GB    2270344 A  *  3/1994

OTHER PUBLICATIONS

Powder River, Provo, UT; www.powderriver.com; Powder River Livestock Handling Equipment Catalog, Nov. 2005; p. 19; Bolt on Lever Latch and Classic 52-inch Gate with Lever Latch.

(Continued)

*Primary Examiner*—Carlos Lugo
(74) *Attorney, Agent, or Firm*—A Law Firm, P.C.

(57) ABSTRACT

The present apparatus relates to a gate latch mechanism. The gate latch comprises at least two housings wherein the first housing is mountable to a stationary object such as an existing fence or structure and the second housing is mountable to a moveable object such as a gate. In some cases it may useful to mount the first housing to the moveable object and likewise mount the second housing to the stationary object. In one embodiment, the first housing comprises a back plate hingedly connected to two front plates angled outwardly from the back plate and the second housing comprises a latchable mechanism comprising a rod.

15 Claims, 10 Drawing Sheets

U.S. PATENT DOCUMENTS

| | | | |
|---|---|---|---|
| 4,291,908 A | 9/1981 | Gittins, Sr. | |
| 4,355,829 A | 10/1982 | Gregory | |
| 4,451,072 A | 5/1984 | Petty, Sr. | |
| 4,641,545 A | 2/1987 | Rabe | |
| 4,962,953 A | 10/1990 | Priefert | |
| 5,050,344 A | 9/1991 | Skeem | |
| 5,080,408 A | 1/1992 | McBay | |
| 5,094,485 A | 3/1992 | Lycett | |
| 5,125,695 A * | 6/1992 | Hartwell | 292/62 |
| 5,199,753 A | 4/1993 | Presley, Jr. | |
| 5,433,037 A | 7/1995 | Pazio | |
| 6,170,892 B1 | 1/2001 | Lantiegne | |
| 6,192,629 B1 | 2/2001 | Akins et al. | |
| 6,408,571 B1 | 6/2002 | Trott | |
| 6,789,786 B1 | 9/2004 | Schatzberg | |
| 7,066,502 B1 | 6/2006 | Makus | |
| 2006/0038416 A1 | 2/2006 | Nesseth | |

OTHER PUBLICATIONS

Behlen Mfg. Co, Columbus, NE; www.behlencountry.com; Behlen Country 2005 Catalog; p. 3; Heavy Duty Spring Loaded Piston Latch.

Behlen Mfg. Co, Columbus, NE; www.behlencountry.com; Behlen Country 2005 Catalog; p. 17; Bolt-on Double Piston Lever Latch.

* cited by examiner

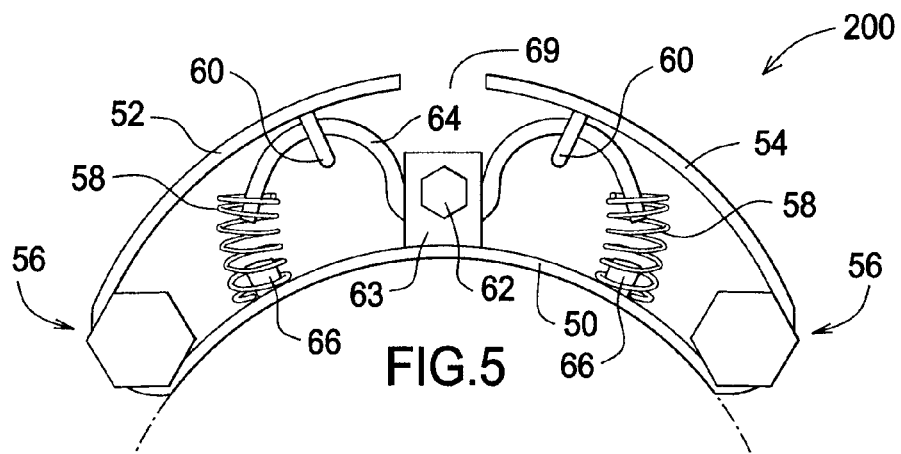
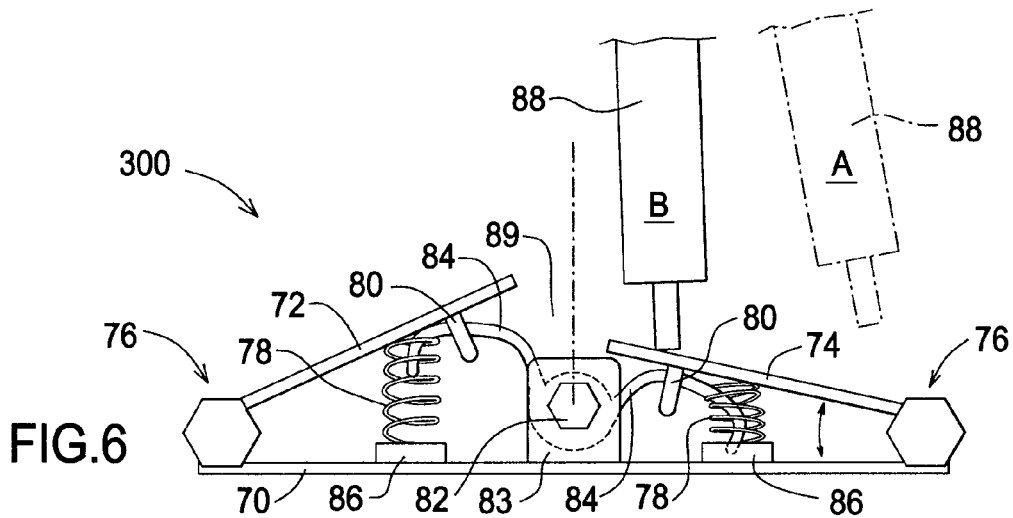
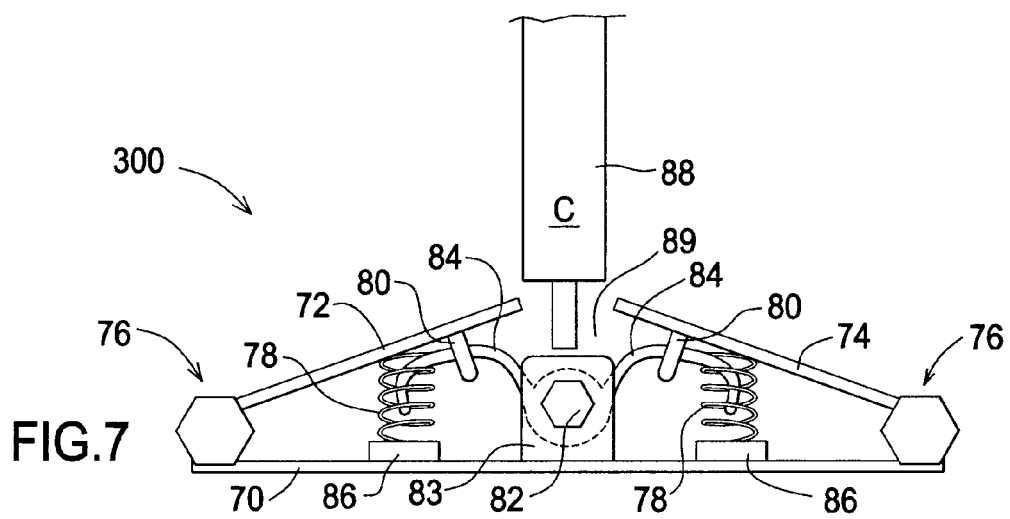

GATE LATCH

CROSS REFERENCE APPLICATIONS

This application is a non-provisional application claiming the benefits of provisional application No. 60/863,057 filed Oct. 26, 2006.

FIELD OF ART

The present apparatus relates to a gate latch mechanism. More specifically, the present apparatus relates to a gate latch mechanism comprising at least two housings for use on gate systems such as those located on farms and ranches.

BACKGROUND

Numerous gate latches have been employed in fences on ranches and farms to allow access to a restricted area, such as an animal restraining enclosure. For example, many farmers and ranchers use a simple chain and padlock to secure their gates. Another familiar type of gate latch comprises a U-shaped member pivoted to turn about its supporting post and also pivoted to raise and lower about a horizontal axis. Other types of gate latches commonly employ a latch bar with a cooperating latch mechanism. Typically, the latch bar is installed on the gate and the latch mechanism is installed on the gate post. For example, a typical latch bar could be a spring-loaded piston latch. With these types of latches, if a large amount of force is exerted to close the gate, the gate may swing through and pass its locking mechanism causing the gate to inadvertently swing open. In addition, large gates do not often include dependable locking mechanisms.

To control the movement of animals, users typically use gates which are pivotally mounted at one end with latch mechanisms at the other end. These types of gates may be opened or closed numerous times during the movement and/or sorting of animals. These gates may also be closed during the period of time of the animals' confinement, which could at times be a lengthy amount of time. Those who work with livestock often are on horseback during many animal control operations. Therefore, it is advantageous to be able to open and latch gates from horseback so that a rider does not have to dismount in order to operate a gate latch. In the case of a typical double piston lever latch or "cowboy latch", a user often must position himself (and his horse) very close to the gate to gain leverage to disengage the latch from a post so that the gate may be opened. Generally, horses are difficult to maneuver into this position and the device is difficult to use.

A need remains for a gate latching system that provides security, is simple in construction, is easy to maneuver, is durable and overcomes the above-noted shortcomings.

SUMMARY OF THE DISCLOSURE

Most gates do not have built-in latching devices. The present apparatus is adaptable to numerous gate applications, for a multitude of applications. For example, the apparatus may be used on yard and garden gates, corral and fence gates, and any other suitable enclosure. The present apparatus provides a gate latching mechanism for securing a gate into a closed position.

One embodiment of the present apparatus discloses an adjustable latchable mechanism that comprises at least one bracket mounted on a gate horizontally. A spring-loaded rod is insertable through at least one ring attached to the bracket. An optional bracket may be utilized to vertically secure the latchable mechanism to the gate. The rod may be slid in the appropriate direction to disengage the rod from a receiver or "catch". The gate may then be opened. A user releases the rod and a spring urges the rod back to its starting position. As the gate shuts, the rod will engage the receiver and latch the gate to the fence.

Another embodiment of the present apparatus discloses a spring-loaded gate catch or receiver comprising a back plate hinged to two front plates angled outwardly from the back plate. At least one securement ring may be attached to the backside of each front plate. At least one support tab may be attached to the back plate. A portion of a trigger may be inserted into a securement ring on each front plate. The trigger may be attached to the back plate with a bolt via the support tabs. At least two springs are coupled to an end portion of the trigger. The trigger may pivot when pressure is applied to either front plate. When one front plate moves inward, the other front plate moves outward to engage the latchable mechanism to prevent a gate from swinging beyond the outwardly positioned plate. In other words, the outwardly positioned plate acts as a stop.

The receiver embodiment could be beneficial in that only a small amount of force is needed to latch the gate. Even when a small amount of force is applied to a first front plate by a latchable mechanism, the second front plate is pushed outward by the trigger thereby stopping the latchable mechanism from passing beyond the outwardly positioned second plate. The latchable mechanism passes the edge of the first plate. As the first plate springs to a neutral position the latchable mechanism is housed in the present apparatus in a closed and locked center position. The apparatus helps to stop any backlash of the gate, prohibits the gate latch from popping back open and prevents the gate from swinging through. The present apparatus is also useful in cases where a great amount of force is exerted on a gate and its corresponding latch.

Conventional spring latches may work with the receiver of the present apparatus because it is designed to relieve sudden impact pressures on latches that occur as a result of a gate being slammed shut. Conventional receivers and latchable mechanisms often bounce back or spring through when excessive force is used, resulting in the gate being left open. If a gate bounces back or swings through, as often happens when sorting livestock, an owner/operator may be forced to rework their animals, costing time and money. The present apparatus is able to universally interact with a multitude of different latches to prevent bounce back, backlash and swing through, thus saving the owner/operator the time and expense of reworking livestock as well as minimizing the potential for personal injury or animal injury.

Another embodiment of the present apparatus includes a hand- or foot-operated rail-mounted receiver. The rail-mounted receiver can be mounted to a receiver assembly having a control lever. When the control lever is pressed, the receiver may slide on the rails of the receiver assembly and release the gate. The gate may be pushed open with a user's hands, hip, foot, etc. Upon release of pressure from the control lever, a spring on the bottom of the rail-mounted receiver may return the receiver back to its original lockable position. A user can then push the gate closed. The latchable mechanism will engage the receiver and latch the gate as described above. With a foot-operated embodiment, the rail-mounted receiver may be mounted so that the gate is opened when the control lever is activated by pressure from a user's foot. Alternatively the rail-mounted receiver embodiment could be mounted with the control lever away from the ground, i.e. at the top of the post. The control lever may then be activated by pressure on the control lever by a user's hand, arm, shoulder, etc.

These and other features and advantages of the disclosed apparatus reside in the construction of parts and the combination thereof, the mode of operation and use, as will become more apparent from the following description, reference being made to the accompanying drawings that form a part of this specification wherein like reference characters designate corresponding parts in the several views. The embodiments and features thereof are described and illustrated in conjunction with systems, tools and methods which are meant to exemplify and to illustrate, not being limiting in scope.

BRIEF DESCRIPTION OF THE DRAWINGS

FIG. 5 shows an alternate embodiment of a receiver.
FIG. 6 shows another embodiment of a receiver, wherein a latchable mechanism is compressing a spring.
FIG. 7 shows the latchable mechanism of FIG. 6 in the center position.

Before explaining the disclosed embodiments in detail, it is to be understood that the embodiments are not limited in application to the details of the particular arrangements shown, since other embodiments are possible. Also, the terminology used herein is for the purpose of description and not of limitation.

DETAILED DESCRIPTION OF THE DRAWINGS

Figure 1:
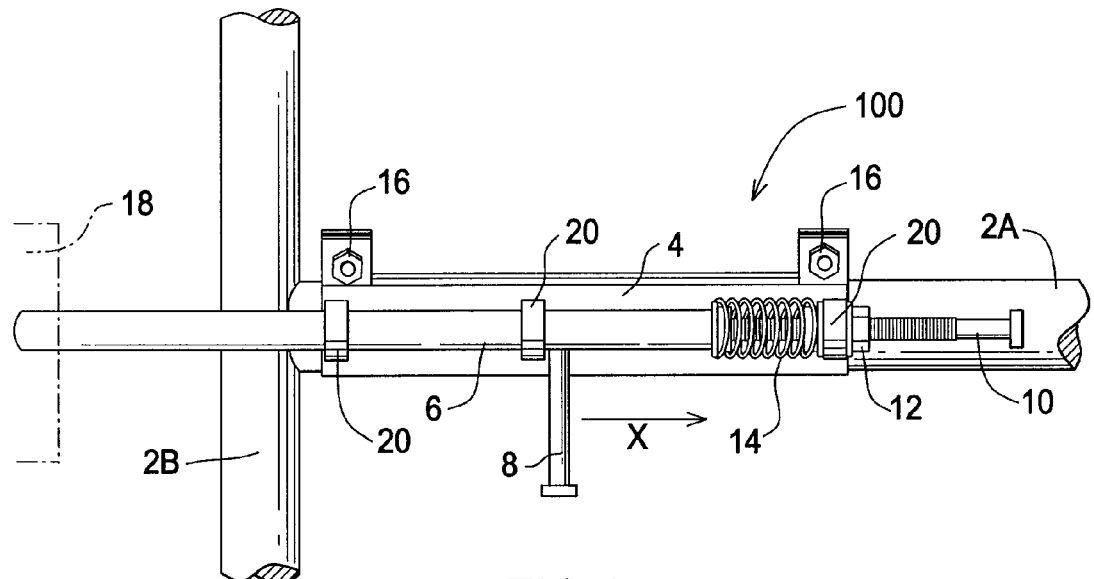
FIG. 1 is a front elevation view of a latchable mechanism in a closed position.

FIG. 1 shows a latchable mechanism 100 in a closed position mounted on a post (or tubular section) 2A of a gate (not shown). A post (or tubular section) 2B is shown for illustrative purposes. A rod 6 is engaged in a receiver 18 shown in dotted format. Latchable mechanism 100 is adaptable to numerous gate applications, pre-manufacture, custom built, metal, wood, etc., for a multitude of applications. For example, the apparatus may be attached to yard and garden gates, corral and fence gates, horse trailers, tail gates, etc. and any other suitable enclosure. Latchable mechanism 100 may be comprised of a bracket 4 and rod 6. Bracket 4 may comprise at least one ring 20 and fastening means 16. Although, fastening means 16, e.g., bolt and nut, clamp, etc., may be used to attach bracket 4 to post 2A, any known fastening means may be used to secure bracket 4 to post 2A. Bracket 4 may be adjustable and may be removably mounted on either end of a gate or post 2B, if desired. Bracket 4 may also be permanently mounted to posts 2A, 2B, if desired. For example, bracket 4 may be welded to posts 2A, 2B. Rod 6 may comprise a bolt 10, a nut 12 and a spring 14. Handle 8 facilitates the opening of the system in direction X. Although the figures and description suggest that a receiver be mounted on a stationary object, such as a post or a structure, it is contemplated that it may be more appropriate to mount a receiver to a gate, i.e. a movable object. Likewise, a latchable mechanism could be mounted to a stationary post or structure rather than on a gate section as suggested in the figures.

Figure 3:
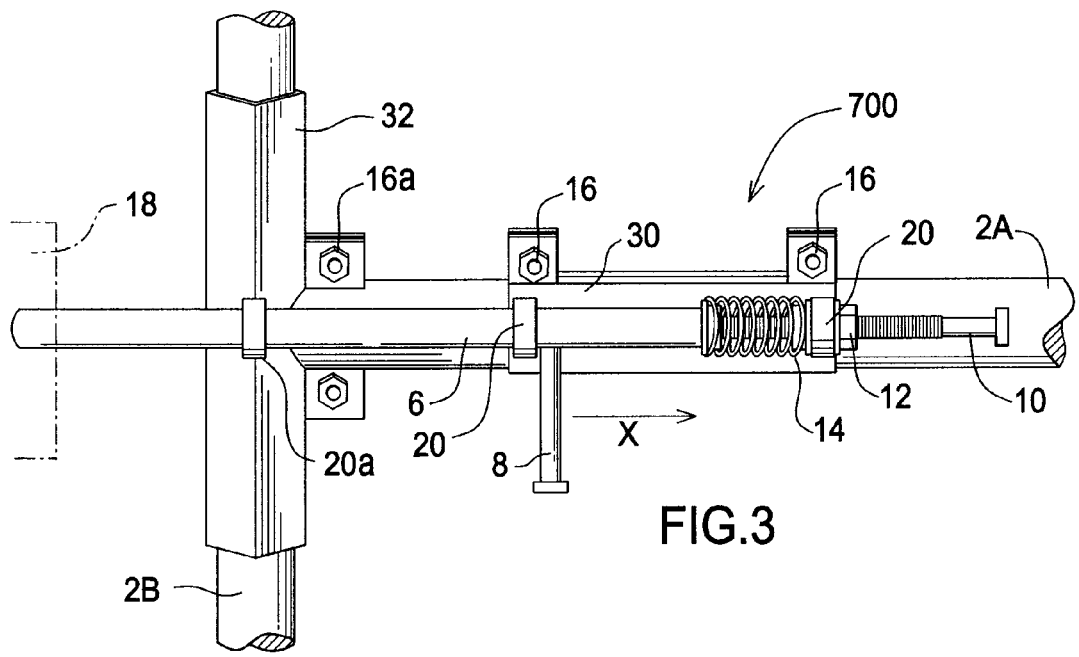
FIG. 3 is a front elevation view of another embodiment of the latchable mechanism of FIG. 1.

FIG. 3 depicts another embodiment of the device of FIG. 1. As in FIG. 1, a latchable mechanism 700 may comprise bracket 30. Bracket 30 may be mounted horizontally on post 2A. Bracket 30 may comprise at least one ring 20 and fastening means 16. Fastening means 16 may be used to attach bracket 30 to post 2A. Here, optional bracket 32 may be mounted vertically on post 2B. Optional bracket 32 may also comprise at least one ring 20a and fastening means 16a. Fastening means 16a may be used to attach bracket 32 to post 2B. Optional bracket 32 may help stabilize rod 6 upon the gate. As in FIG. 1, handle 8 facilitates the opening of the system in direction X.

Figure 2:
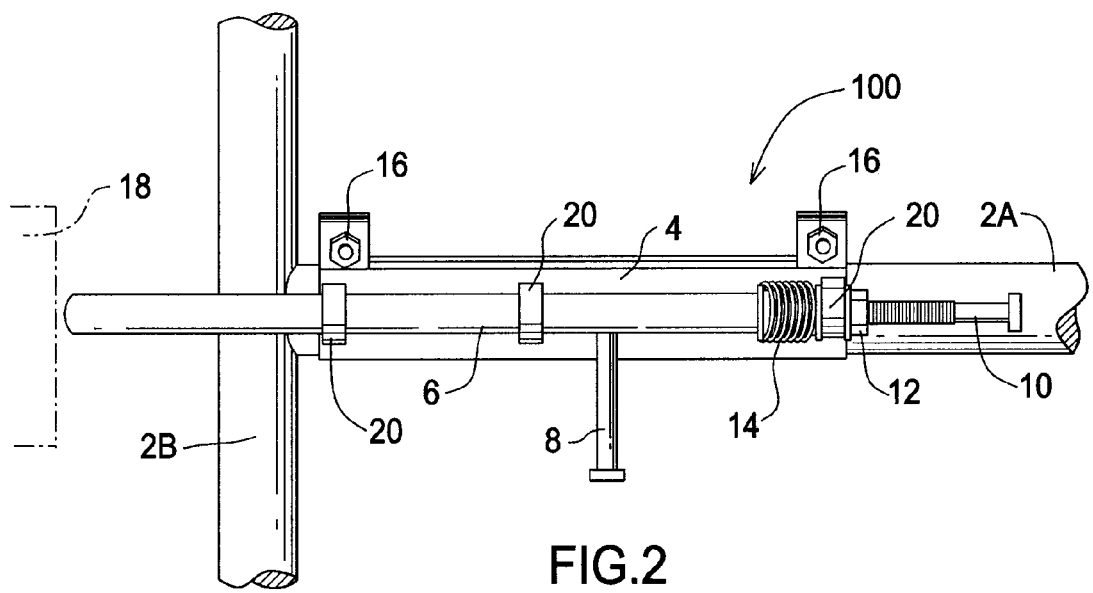
FIG. 2 is a front elevation view of a latchable mechanism in an open position.

The devices 100, 700, shown in FIGS. 1, 3 respectively, may be opened as illustrated in FIG. 2. A user moves handle 8 in direction X thereby compressing spring 14. As handle 8 and rod 6 move in direction X, rod 6 disengages from receiver 18 shown in dotted format. The gate may be opened and a user may release handle 8. Upon release of handle 8, spring 14 urges rod 6 back to its original position. As the gate is closed, rod 6 can engage receiver 18 and latch the gate. The present apparatus could incorporate a spring delay mechanism to keep spring 14 from urging rod 6 back to its original position upon release of handle 8 until the action is desired.

Figure 17:
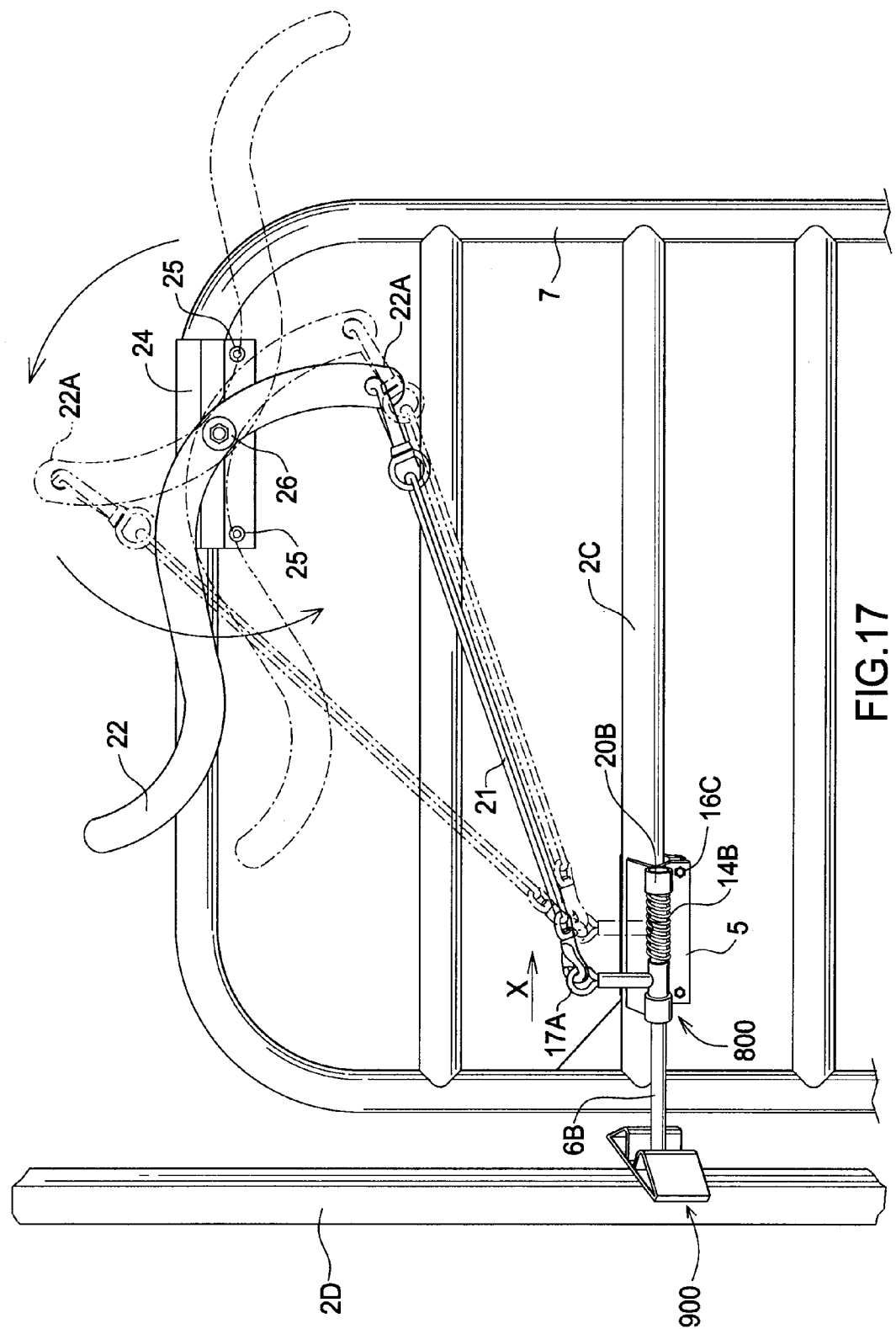
FIG. 17 depicts another embodiment of a latchable mechanism in a closed position in a receiver.
Figure 18:
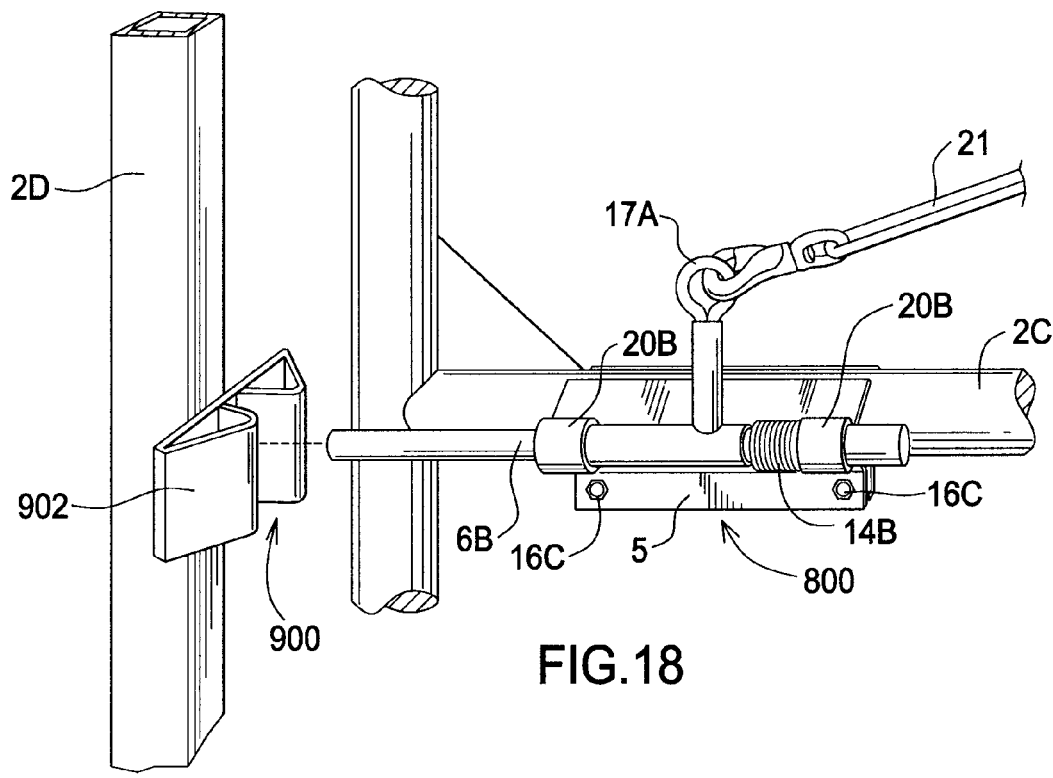
FIG. 18 depicts the latchable mechanism of FIG. 17 in an open position.
Figure 20:
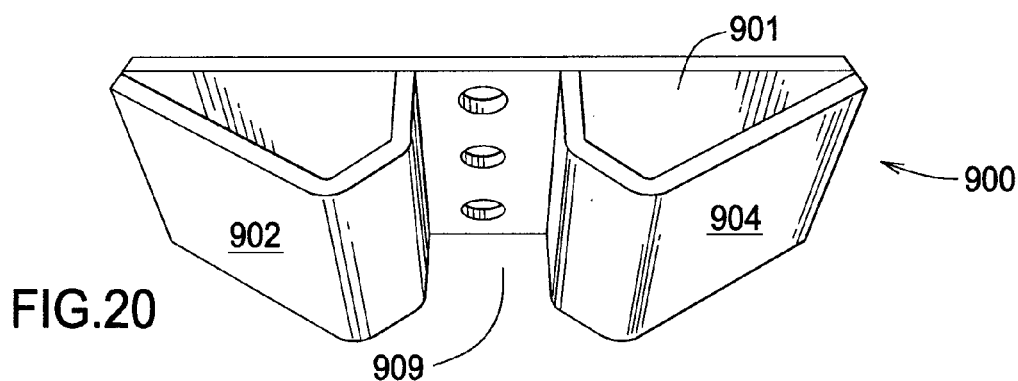
FIGS. 20-21 show other embodiments of the disclosed receiver
Figure 21:
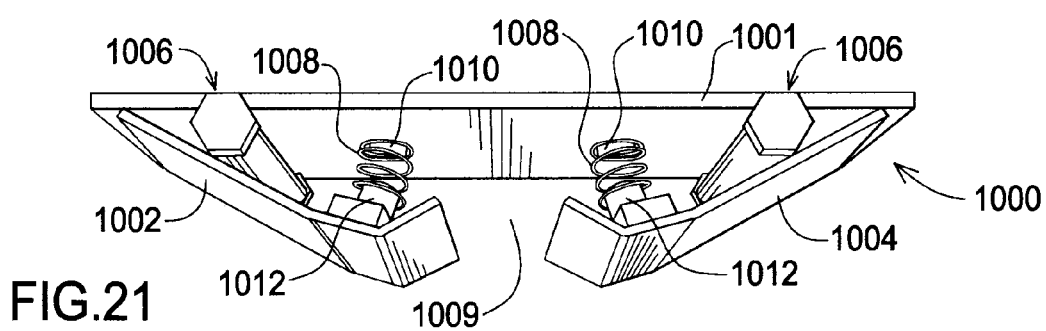

Referring now to FIGS. 17-18, which show an alternate embodiment of a latchable mechanism, a latchable mechanism 800 can be seen mounted on a post (or tubular section) 2C of a gate 7. In FIG. 18 latchable mechanism 800 is shown in an open position while in FIG. 17 latchable mechanism 800 is shown in a closed position. Receiver 900 is mounted on post 2D.

Figure 19:
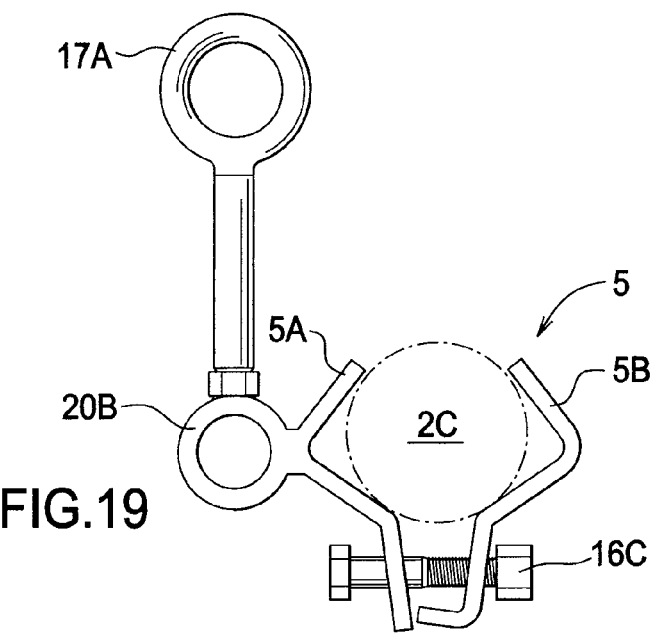
FIG. 19 shows an end view of the latchable mechanism of FIGS. 17-18.
Figure 22:
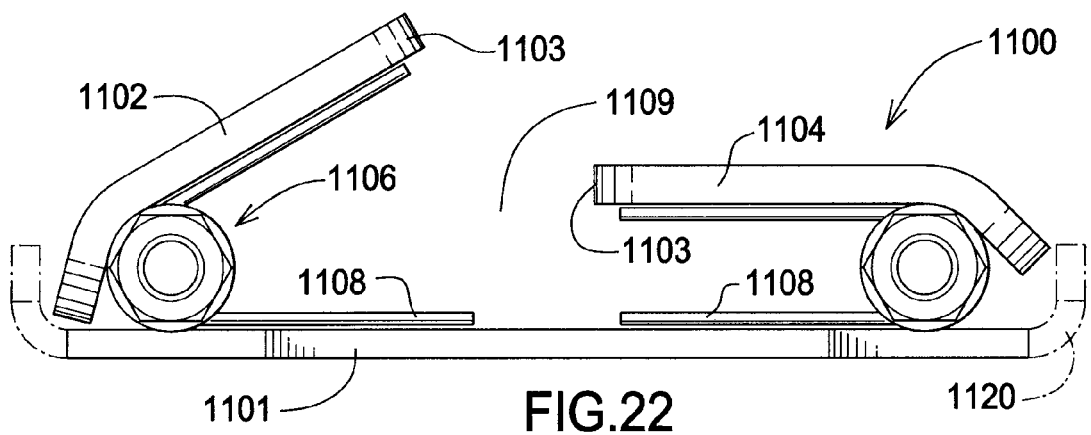
FIG. 22 shows an alternate embodiment of a receiver.
Figure 23:
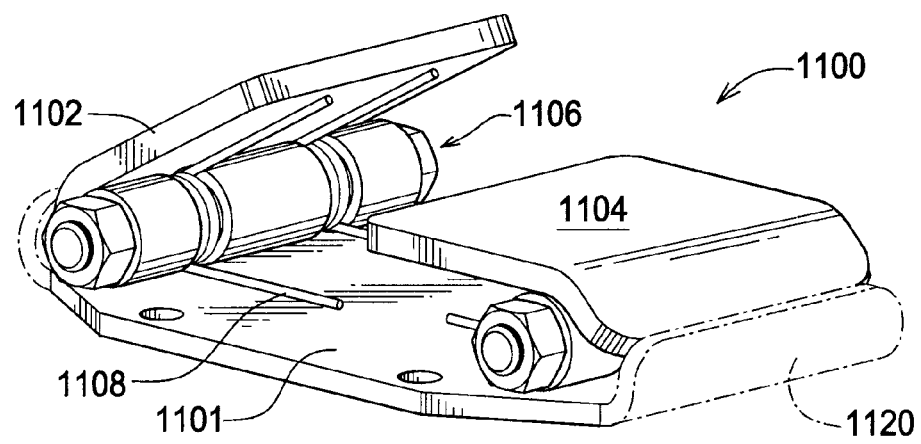
FIG. 23 is a perspective view of the receiver of FIG. 22.

Latchable mechanism 800 comprises rod 6B which engages receiver 900. Brackets 5A and 5B encircle a gate portion or post 2C. See also FIG. 19. Although, fastening means 16C, such as a bolt and a nut, may be used to secure bracket 5 to post 2C, any known fastening means may be used. Bracket 5 may be adjustable and/or removably mounted on either end of gate 7 or post 2D if desired. Alternately, bracket 5 can form a permanently mounted system if desired. For example, bracket 5 may be welded. Rod 6B may comprise a spring 14B. Ring 20B could be useful in securing rod 6B. Bracket 5B comprises a construction capable of reducing mechanical stress to at least a portion of post 2C. For example, bracket 5B is constructed so that a portion of the bracket supports at least a bottom portion of post 2C.

Bracket 24 may facilitate an opening of gate 7. As shown, bracket 24 comprises pump handle 22 for a user's ease. In this embodiment, pump handle 22 may be attached to bracket 24 by fastening means 26 which may also allow for swivel. Any known fastening means 25 may be used to secure bracket 24 to gate 7. A tension means 21 provides a connective link between latchable mechanism 800 and handle 22. In the FIG. 17 embodiment, tension means 21 takes the form of a rope; however other suitable devices may be used. Tension means 21 is looped through eyebolt 17A and attached to an end 22A of handle 22.

As a user motivates pump handle 22 in the direction shown, rod 6B disengages from receiver 900. Gate 7 may be opened and a user may release pump handle 22. Upon release of pump handle 22, spring 14B urges rod 6B back to its original position. As gate 7 is closed, rod 6B can engage receiver 900 and latch the gate. As stated above, a spring delay mechanism may be utilized to delay spring 14B from urging rod 6B back to its original position upon release of pump handle 22 until the action is desired.

In the disclosed embodiments, brackets, rods, handles and/or springs may be constructed out of prefabricated metal, iron, plastic, etc. depending on the use desired. It is also contemplated that these components could vary in size, shape, construction and/or location and still fall within the scope of the disclosed apparatus.

Figure 4:
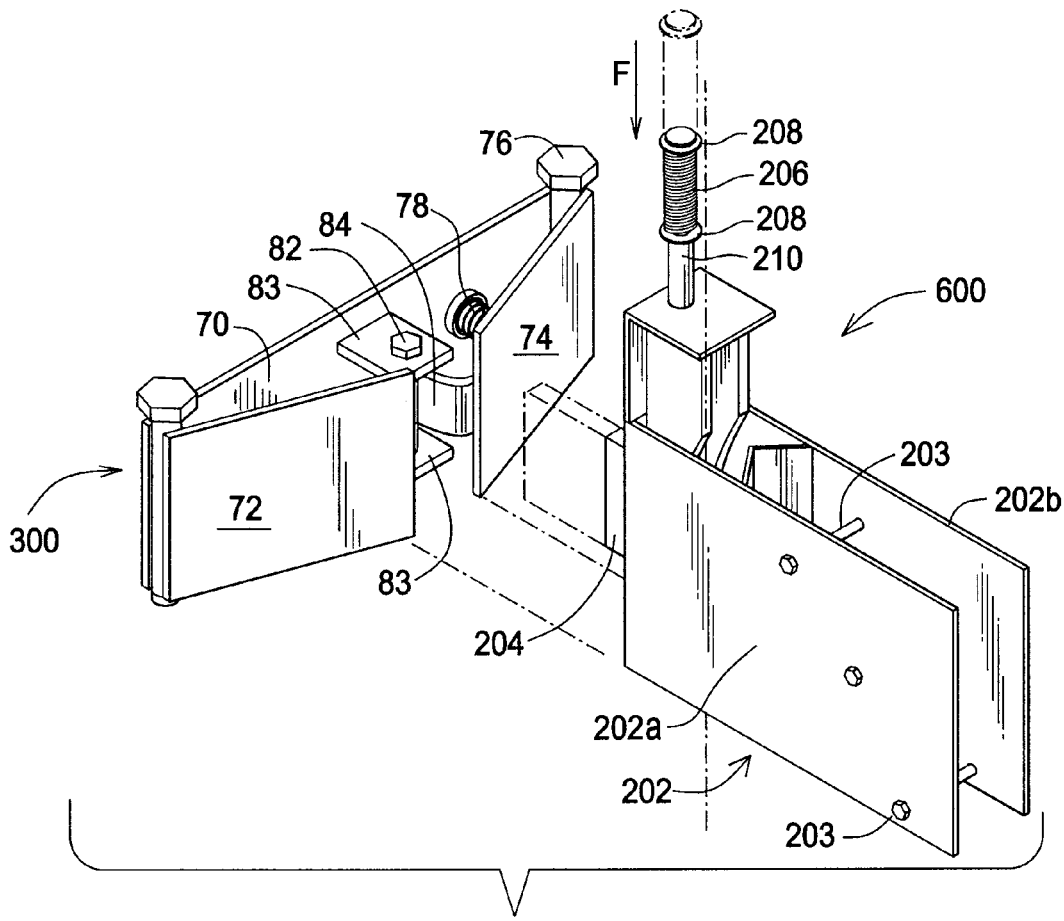
FIG. 4 is a perspective view of another embodiment of a latchable mechanism shown in combination with a receiver embodiment.
Figure 8:
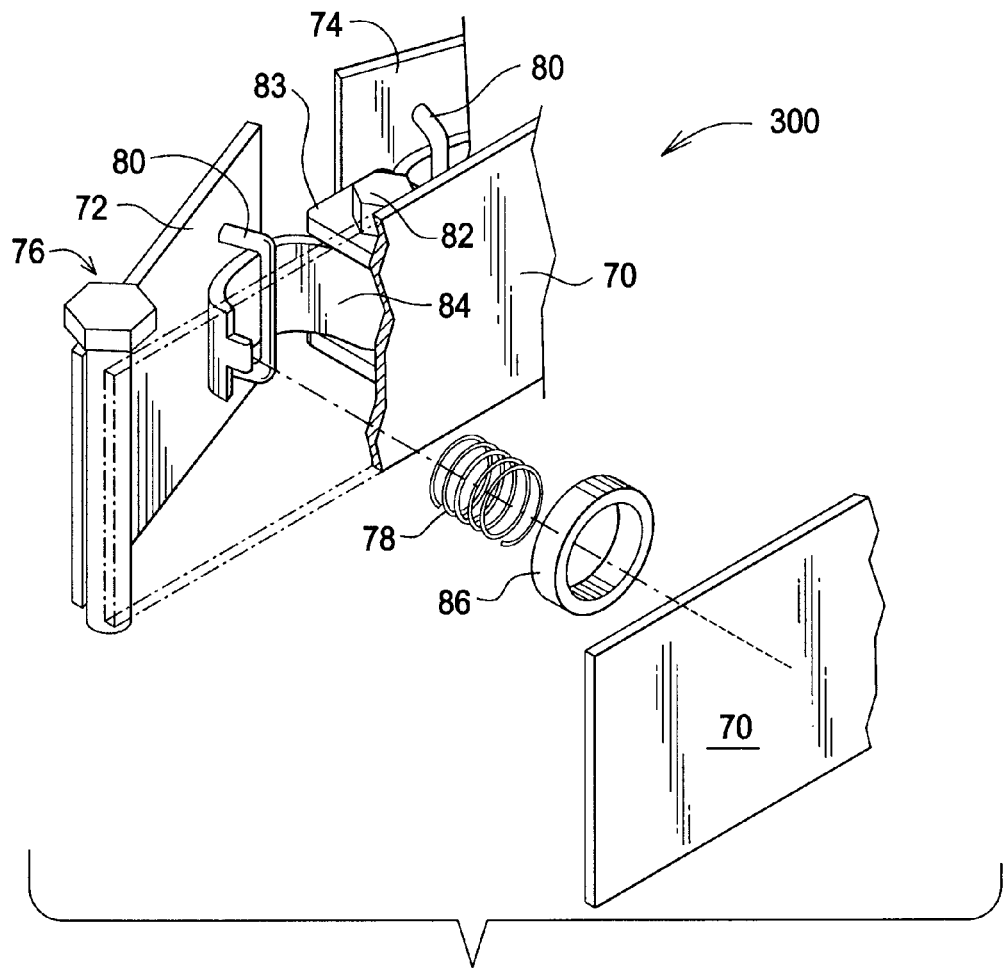
FIG. 8 is a back perspective cut-away exploded view of the receiver of FIG. 6.
Figure 14:
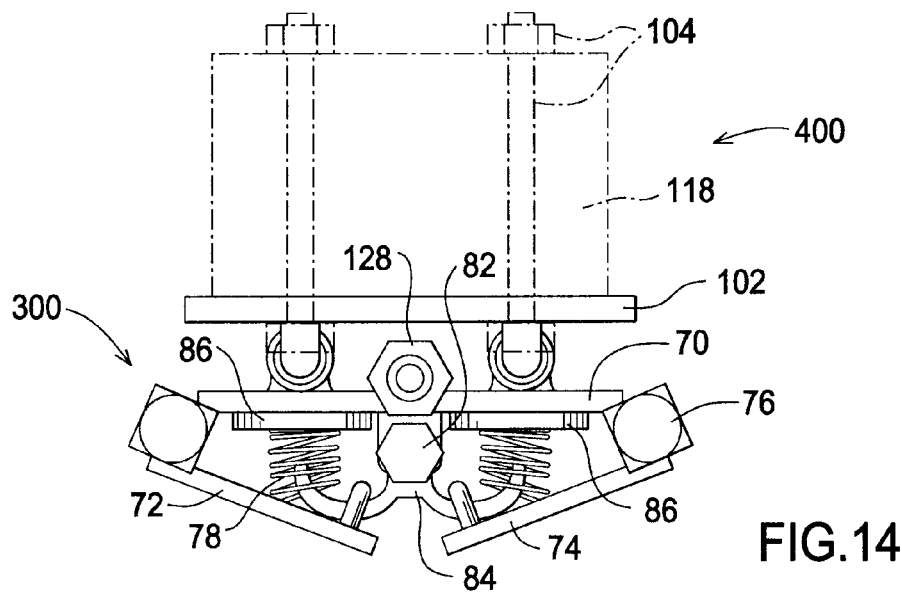
FIG. 14 is a top plan view of the rail-mounted receiver of FIG. 11.

FIG. 4 shows a latchable mechanism 600 and a receiver 300. Latchable mechanism 600 may be mounted on a gate and receiver 300 (described below) may be mounted on a fence pole or other suitable structure, e.g. the side of a house. Latchable mechanism 600 and receiver 300 are adaptable to numerous gate applications, pre-manufacture, custom built, metal, wood, etc., for a multitude of applications. For example, they may be attached to yard and garden gates, corral and fence gates, and any other suitable enclosure. Here latchable mechanism 600 comprises a housing 202 having two plates, 202a, 202b. Housing 202 may comprise a spring-loaded rod 204, a spring-loaded lever 210 and fastening means 203. Although fastening means 203, such as a bolt and a nut, may be used to attach housing 202 to a gate, any known fastening means may be used. Housing 202 may be adjustable and may be removably mounted on either end of a gate. Housing 202 may also be permanently mounted to the gate. For example, housing 202 may be welded to the gate. In this embodiment, rod 204 is retractable. FIG. 4 shows the present apparatus in an open configuration. The closed position is indicated in dotted format, whereby rod 204 extends to engage plates 72, 74. Rod 204 may comprise a rod spring (not shown) to urge rod 204 toward and from the receiver mechanism. Lever 210 may comprise a spring 206 and washers 208.

As stated above, latchable mechanism 600 is mounted on a gate while receiver 300 mounts to another structure. To open the gate, a user applies a force in direction F to lever 210. Spring 206 may compress thereby causing a rod spring (not shown) to compress urging rod 204 out of receiver 300. The gate may then be opened. To close the gate, a user releases lever 210. Spring 206 urges lever 210 back to its original position. As lever 210 moves back to its original position, the rod spring may expand and rod 204 is urged back into its original position. As the gate is closed, rod 204 can engage plates 72, 74 of receiver 300 and latch the gate. The present apparatus could incorporate a spring delay mechanism to keep the rod spring from urging rod 204 back to its original position upon release of lever 210 until the action is desired. The receiver 300 is further described below.

Housing 202, rod 204 and lever 210 may be constructed out of prefabricated metal, iron, plastic, etc. depending on the desired use. It is also contemplated that housing 202, rod 204, lever 210 and spring 208 could vary in size, shape, construction and/or location and still fall within the scope of the disclosed apparatus.

Figure 9:
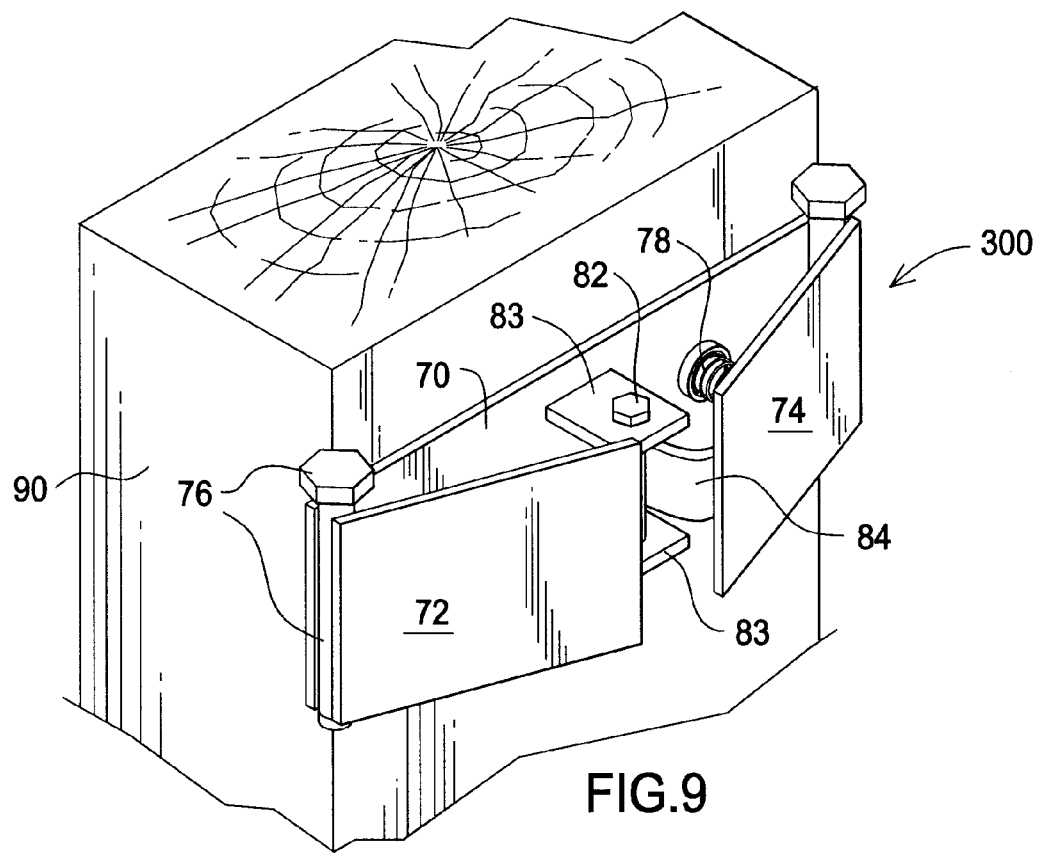
FIG. 9 is a perspective view of the receiver of FIG. 6.
Figure 10:
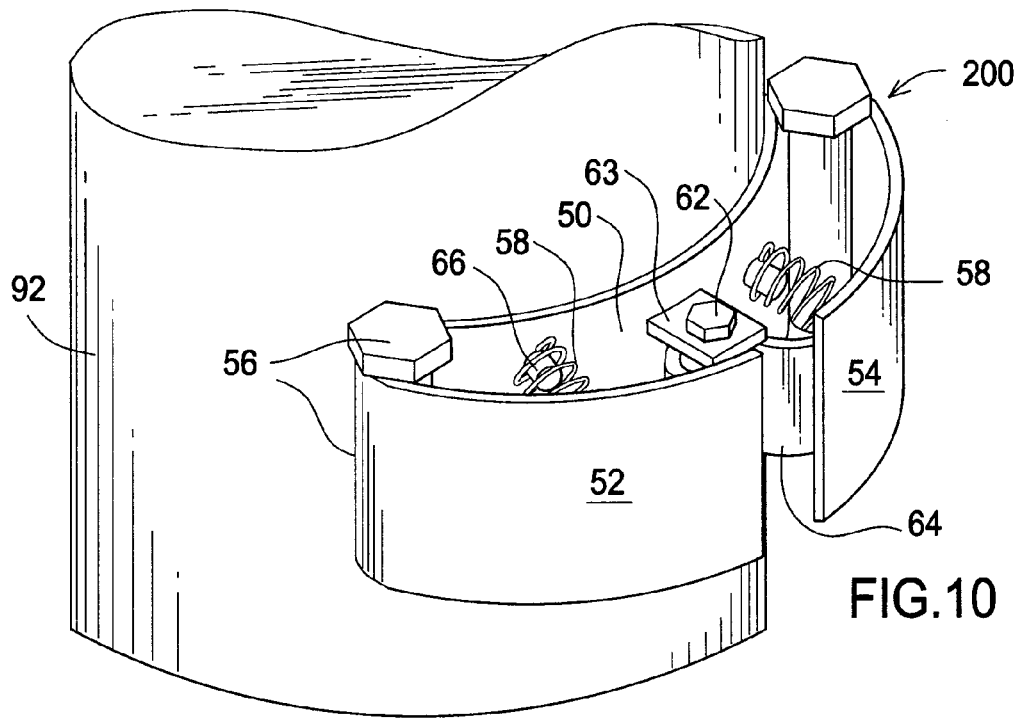
FIG. 10 is a perspective view of the receiver of FIG. 5.

FIGS. 5-10, 20-23 illustrate various embodiments of the receiver of the present apparatus. FIGS. 5 and 10 show a receiver 200 useful for rounded post mounts. Receiver 200 may be mounted on a post 92 in an adjustable or permanent configuration in a known manner. For example, receiver 200 may be attached to a post with fastening means such as bolts, nuts and/or screws or it may be permanently welded to a post.

Receiver 200 may comprise a back plate 50, hingedly connected to two front plates 52 and 54 via hinges 56. There may be an opening 69 between front plates 52 and 54 to house a latchable mechanism. At least one securement ring 60 may be attached to the backside of front plates 52 and 54. At least one support tab 63 may be attached to back plate 50. A portion of a trigger 64 may be inserted into securement rings 60 on front plates 52 and 54. Trigger 64 may be secured to back plate 50 with a bolt 62 via the support tabs 63. At least two springs 58 are coupled to an end portion of trigger 64 and mounts 66. Trigger 64 may pivot when pressure is applied to front plate 52 or 54. When pressure is applied to front plate 54 by a latchable mechanism (not shown), front plate 54 may move inwardly and front plate 52 may move outwardly.

Receiver 200 may be constructed out of prefabricated metal, iron, plastic, etc. depending on the desired use. In some cases, a gate is closed with excessive force. It is not unusual for a user to try to slam a gate shut. In such cases, receiver 200 could be constructed from iron or other metal to better endure the amount of force exerted to minimize the chances for the gate to swing through. It is also contemplated that receiver 200 could vary in size, shape, construction and/or location and still fall within the scope of the disclosed apparatus.

FIGS. 6-9 show a receiver 300 that can be adjustably or permanently mounted to a post 90 in a known manner. This embodiment is useful for posts having at least one flat surface or any other suitable flat surface. For example, receiver 300 may be attached to the post with fastening means such as bolts, nuts and/or screws or it may be permanently welded to the post. As shown in FIG. 9, post 90 may be square or rectangular-shaped like many fence posts.

Receiver 300 may comprise a back plate 70, hingedly connected to two front plates 72 and 74 at hinges 76. Front plates 72 and 74 may be angled outwardly from back plate 70. At least one securement ring 80 may be attached to the backside of front plates 72 and 74. There may be an opening 89 between front plates 72 and 74 to house a latchable mechanism 88. At least one support tab 83 may be attached to back plate 70. A portion of a trigger 84 may be inserted into securement rings 80 on front plates 72 and 74. Trigger 84 may be secured to back plate 70 with a bolt 82 via support tabs 83. An end portion of at least two springs 78 are coupled to trigger 84 and mounts 86. Trigger 84 may pivot when pressure is applied to front plate 72 or 74. When pressure is applied to front plate 74 by latchable mechanism 88, front plate 74 may move inwardly and front plate 72 may move outwardly. In FIGS. 6 and 7, latchable mechanism 88 is actually shown to move from position A to position B to position C where it is seated between plates 72, 74.

Receiver 300 and latchable mechanism 88 may be constructed out of prefabricated metal, iron, plastic, etc. depending on the desired use. In some cases, a gate is closed with excessive force. It is not unusual for a user to try to slam a gate shut. In such cases, receiver 300 and latchable mechanism 88 could be constructed from iron or other metal to better endure the amount of force exerted to minimize the chances for the gate to swing through or for damage to latchable mechanism 88. It is also contemplated that receiver 300 and latchable mechanism 88 could vary in size, shape, construction and/or location and still fall within the scope of the disclosed apparatus.

Receivers 200 and 300 may be mounted to any suitable post, including both fence and gate posts, or structure adaptable to receive a gate catch. Receivers 200 and 300 function similarly. When force is applied to a first front plate by latchable mechanism of the present apparatus, a trigger activates a second front plate. The latchable mechanism seats between the front plates, thereby stopping the latchable mechanism from passing beyond either plate, securing the latchable mechanism in the receiver housing of the apparatus. Both plates may spring back to a neutral position to secure the latching mechanism in a center position between the two plates.

Referring now to FIGS. 20-23, receivers 900, 1000, 1100 represent embodiments useful for posts or structures having at least one flat surface. For example, receivers 900, 1000, 1100 may be attached to the post with fastening means such as bolts, nuts and/or screws or it may be permanently welded to the post. The devices disclosed herein can also be readily affixed to a structure, for example a barn etc., if desired.

Receiver 900 may comprise a back plate 901 connected to two front plates 902 and 904. As shown, a portion of each front plate 902 and 904 may be angled outwardly from back plate 901. There may be an opening or bounded area 909 between front plates 902 and 904 to house a portion of a latchable mechanism.

Receiver 1000 may comprise a back plate 1001 hingedly connected to two front plates 1002 and 1004 via hinges 1006. A portion of each front plate 1002 and 1004 may be angled outwardly from back plate 1001. There may be an opening or bounded area 1009 between front plates 1002 and 1004 to house a portion of a latchable mechanism. Springs 1008 are coupled to back plate 1001 via mount 1010 and front plates 1002 and 1004 via mounts 1012. When pressure is applied to either front plate 1002 or 1004 by a latchable mechanism, front plate 1002 or 1004 may move inwardly. When pressure is released, front plate 1002 or 1004 may spring back to a neutral position to secure the latching mechanism in a center position between the two plates. The latchable mechanism seats between the front plates, thereby stopping the latchable mechanism from passing beyond either plate. The latchable mechanism is thereby secured in the receiver housing of the apparatus.

Receiver 1100 may comprise a back plate 1101 hingedly connected to two front plates 1102 and 1104 via hinges 1106. A portion of each front plate 1102 and 1104 may be angled outwardly from back plate 1101. There may be an opening or bounded area 1109 between front plates 1102 and 1104 to house a portion of a latchable mechanism. Springs 1108 are coupled to back plate 1101 via hinges 1106. When pressure is applied to either front plate 1102 or 1104 by a latchable mechanism, front plate 1102 or 1104 may move inwardly. When pressure is released, front plate 1102 or 1104 may spring back to a neutral position to secure the latching mechanism in a center position between the two plates. The latchable mechanism seats between the front plates, thereby stopping the latchable mechanism from passing beyond either plate. The latchable mechanism is thereby secured in the receiver housing of the apparatus. There may also be an end stop 1120 to provide further support for front plates 1102 and 1104.

As with the various receiver embodiments disclosed herein, receivers 900, 1000, 1100 may be constructed out of prefabricated metal, iron, plastic, etc. depending on the desired use. Receivers 900, 1000, 1100 could also be constructed from iron or other metal to better endure the amount of force exerted to minimize the chances for the gate to swing through or for damage to a latchable mechanism. It is also contemplated that receivers 900, 1000, 1100 may could vary in size, shape, construction and/or location and still fall within the scope of the disclosed apparatus.

FIGS. 11-14 show a rail-mounted receiver 400. With this embodiment a receiver of the present apparatus comprises a receiver assembly. The receiver operates in conjunction with a fixed height gate latch to slidably engage and disengage the gate latch.

Figure 13:
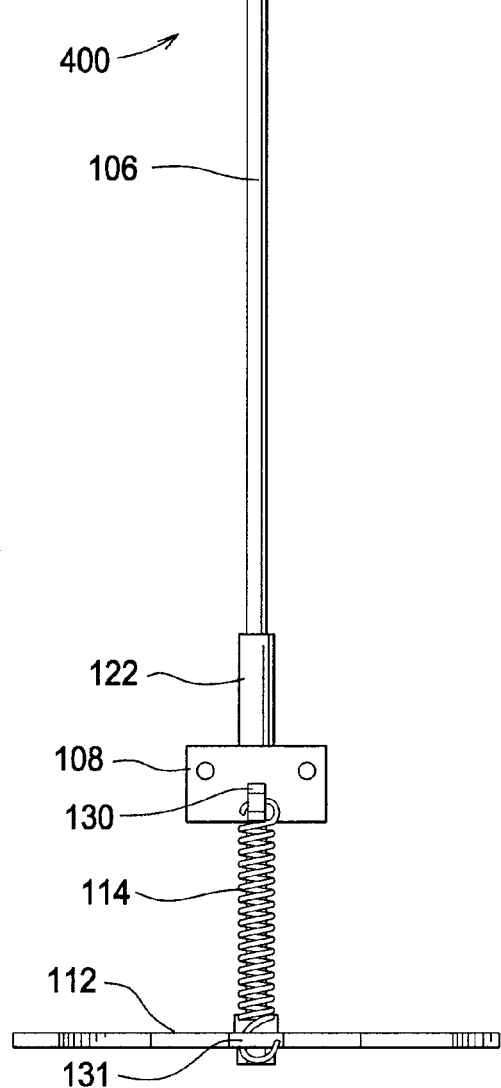
FIG. 13 is a backside elevation view of the embodiment of FIG. 12.

Rail-mounted receiver 400 may comprise a receiver assembly 450, an extension 106, at least one mounting bracket 108, a spring 114 and a control lever 112. Receiver assembly 450 may comprise receiver 300, at least one rail 100, at least one rail receiver 132 and at least one mounting bracket 102. Any suitable means of fastening 104, 110 may be used to attach rail-mounted receiver 400 to a post 118. Rail-mounted receiver 400 may be mounted to any suitable post or structure adaptable to receive a gate catch. In addition, rail-mounted receiver 400 may be adjustable and may be removably mounted. Alternatively rail-mounted receiver 400 may be permanently mounted to post 118. Extension 106 acts as a guide for receiver assembly 450 and lever 112. Any suitable fastening means 128 may be used to attach receiver assembly 450 to extension 106. In this embodiment, extension 106 may be received in a housing 122 mountable to bracket 108, however other design configurations are possible. Similarly, other design configurations are possible for attaching control lever 112 to bracket 108. While it is shown that extension 106 may be secured to control lever 112 by at least one fastening means 116, control lever 102 can be fastened by any known means. Extension 106 may be shortened or lengthened as desired depending on the application. Spring 114 contacts bracket 108 and control lever 112 by means of attachments 130, 131, respectively. FIG. 13 shows a back side view of rail-mounted receiver 400 and rail receiver 132.

Figure 11:
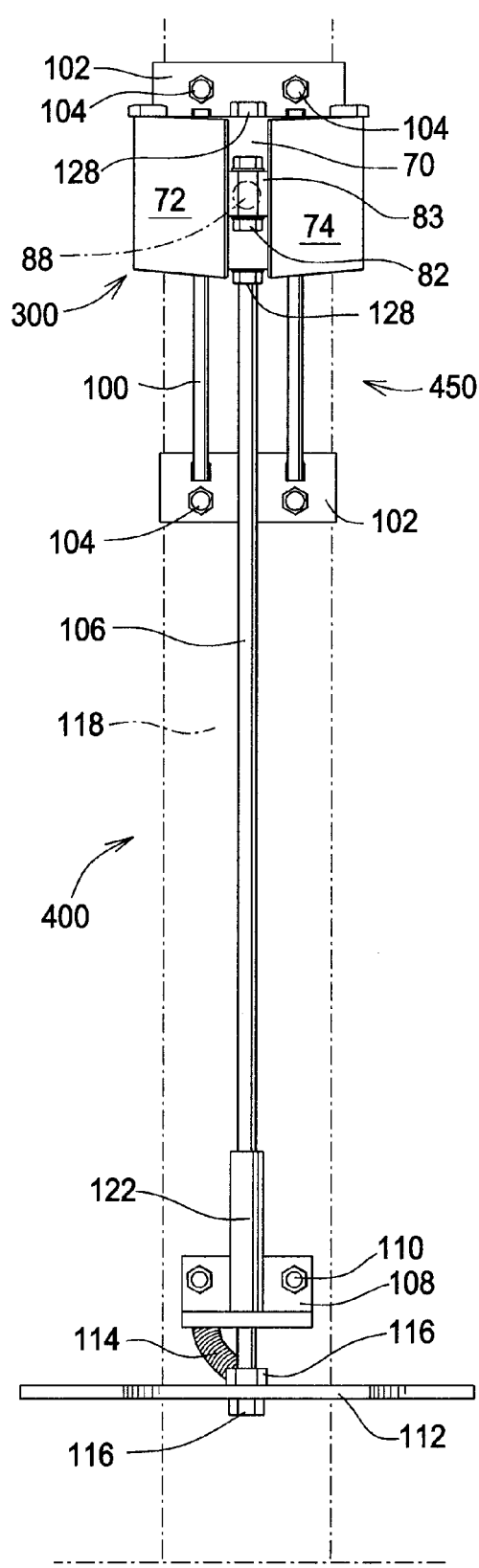
FIG. 11 is a front elevation view of an embodiment of a rail-mounted receiver in a closed position.
Figure 12:
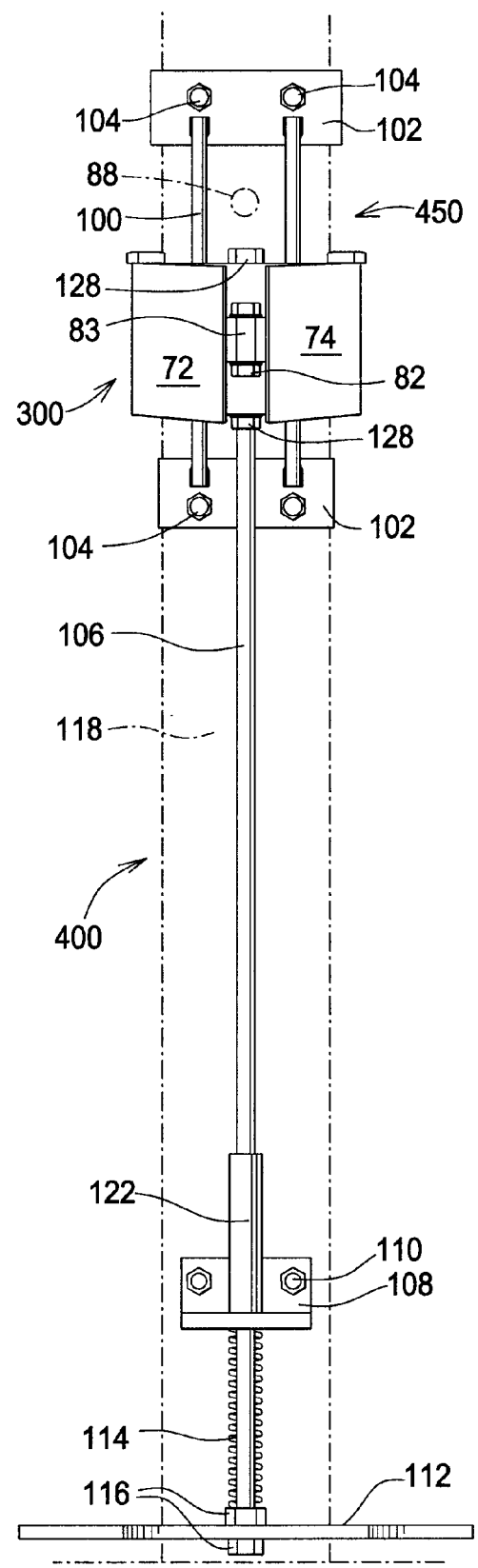
FIG. 12 is a front elevation view of the rail-mounted receiver of FIG. 11 in an open position.

FIG. 11 shows rail-mounted receiver 400 in a closed position and FIG. 12 shows rail-mounted receiver 400 in an open position. Latchable mechanism 88 is shown in dotted lines. To disengage the gate latch and open the gate, pressure is applied to control lever 112. Depending on the application, an upward or downward pressure may suffice. Receiver 300 may slide on rails 100 thereby releasing latchable mechanism 88 from between front plates 72 and 74. The gate (not shown) may then be pushed open with a user's hands, hip, foot, etc.

In the embodiment shown, a downward pressure causes control lever 112 to be lowered and spring 114 to extend such that receiver 300 slides from its closed position. Upon release of pressure from control lever 112, spring 114 urges receiver 300 back to its original lockable position. A user can push the gate closed. Latchable mechanism 88 will catch and latch as described above. Control lever 112 could be activated by a pressure from a user's foot. The present apparatus could incorporate a spring delay mechanism as described above could be used to delay the closure of the mechanism until the action is desired. In some cases, the receiver could simply slide to engage the latchable mechanism without employing the trigger feature of the receiver plates.

Receiver assembly 450, extension 106, mounting bracket 108 and control lever 112 may be constructed out of prefabricated metal, iron, plastic, etc. depending on the desired use. It is also contemplated that receiver assembly 450, extension 106, mounting bracket 108, control lever 112 and spring 114 could vary in size, shape, construction and/or location and still fall within the scope of the disclosed apparatus. Although the figures suggest the use of receiver 300 with the rail-mounted receiver 400, it is contemplated that any of the receivers disclosed herein could be used interchangeably if desired. For that matter, the receivers can be interchanged for any suitable application.

Figure 15:
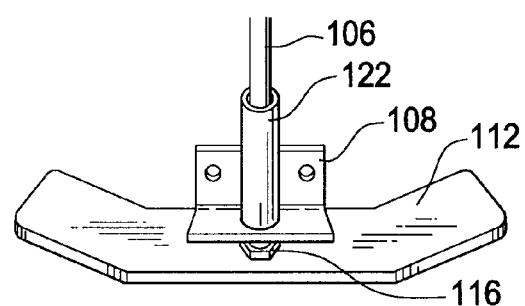
FIG. 15 is a perspective view of one embodiment of a control lever.

FIG. 15 shows the control lever 112 of FIGS. 11-16 as a one-piece construction, however other configurations are possible. In addition, other shape configurations, i.e. full arc, could be incorporated if desired.

Figure 16:
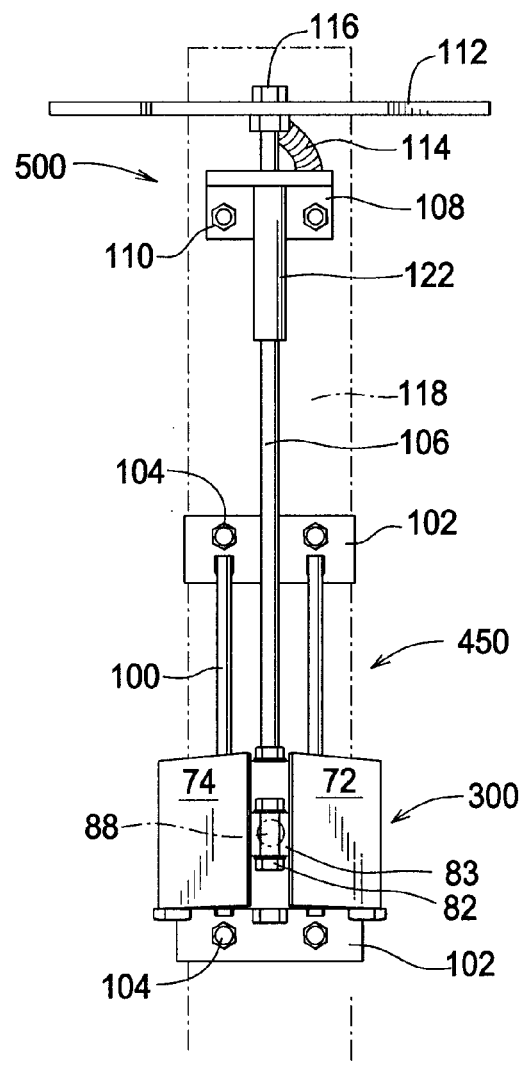
FIG. 16 is a front elevation view of an alternate rail-mounted receiver embodiment in a closed position.

Rail-mounted receiver 500 is shown in FIG. 16. In this embodiment, rail-mounted receiver 500 is mounted to post 118 in a known manner with control lever 112 away from the ground, i.e. at the top of the post 118. The gate may be opened similarly to the way a gate is opened using rail-mounted receiver 400. However, control lever 112 may be activated by pressure applied to control lever 112 at a desired height. With this option, a user may activate control lever 112 with a hand, arm, shoulder, etc. Any suitable height could be accommodated.

Any of the devices disclosed herein could be adapted to operate in conjunction with an electronic and/or remotely activated system. Such a system could enable a disengagement of latchable mechanism from a receiver housing without manual oversight.

While a number of exemplifying features and embodiments have been discussed above, those of skill in the art will recognize certain modifications, permutations, additions and subcombinations thereof. No limitation with respect to the specific embodiments disclosed herein is intended or should be inferred. Other alternate embodiments of the present apparatus could be easily employed by those skilled in the art to achieve the locking function of the present apparatus. It is to be understood that additions, deletions, and changes may be made to the latchable mechanisms, receivers, receiver assemblies, and various internal and external parts disclosed herein and still fall within the true spirit and scope of the gate latch mechanism.

I claim:

1. An assembly comprising:
   a back plate mountable to a stationary or movable member; said back plate connectable to two front plates, wherein a portion of each of said front plates is angled outwardly from said back plate, said back plate comprising a trigger mechanism capable of interdependently actuating said front plates, said front plates forming a bounded area for receiving at least an end of a bracketed rod; said back plates and front plates forming a receiver;
   said trigger mechanism comprising a center support and arcuate arms extending therefrom, each of said arms connected to a ring portion on the backside of an adjacent front plate, a portion of each of said arms passing through a center of a spring mounted between the back plate and its adjacent front plate;
   a bracketed rod mountable to the other one of the stationary or movable member, wherein a distal end of the rod engages the bounded area when it swings partially through the receiver in an arc pattern, the rod further being slidable horizontally along a longitudinal axis relative to its respective stationary or movable member to release the rod end from the bounded area;
   either of said front plates capable of being urged by said rod end to allow its entry into said bounded area, an end of said trigger mechanism oscillating a corresponding front plate toward a compressed mode during the travel of said rod end into the bounded area, an opposing end of said trigger mechanism oscillating a corresponding front plate toward an expanded mode to obstruct the travel of said rod end and causing said rod end to make a contact with said trigger mechanism which also serves as an end stop to discontinue the travel of said rod end; and
   wherein said trigger mechanism oscillates to urges said front plates to their original positions to positively lock said rod end in said bounded area, thereby preventing gate swing through and/or bounce back even after a forceful contact between said rod end and said front plate occurs.

2. The assembly of claim 1, wherein said back plate is hingedly connectable to said front plates.

3. The assembly of claim 1 further comprising a lever capable of retracting said bracketed rod from said bounded area.

4. The assembly of claim 3, wherein said lever is spring-loaded and mounted adjacent said bracketed rod.

5. The assembly of claim 1, wherein a distal end of said trigger mechanism arm can pass through the center of the spring, the distal end making contact with the back plate in a compressed mode.

6. The assembly of claim 1, wherein said trigger mechanism provides for a substantially robust locking system.

7. The assembly of claim 6, wherein said trigger mechanism further comprises a spring.

8. The assembly of claim 1, wherein said receiver further comprises a rail on which said receiver can be height-adjusted, the assembly further comprising a control lever to lower and raise the receiver, the lever capable of being activated by a pressure exerted by a user.

9. The assembly of claim 1, wherein said bracketed rod can be mounted to a tube by means of a clamp having a first section and a second section, each of said sections having an angular-shaped portion capable of supporting a portion of said tube in its respective cleft, said second section of the clamp further comprising a construction capable of reducing mechanical stress to at least a portion of said tube, and wherein a portion of said second section is angled to support at least a bottom portion of said tube.

10. An assembly for use with a gate, said assembly comprising:
   a bracket mountable to the gate or a stationary member in a substantially horizontal position;
   said bracket further comprising a rod;
   a receiver mountable to the other one of the gate or stationary member, said receiver comprising a back plate connectable to two front plates, a portion of each of said front plates angled outwardly from said back plate;
   wherein an end of said rod is capable of being housed in said receiver to secure a gate, either of said front plates being urged by an oscillating trigger mechanism to allow a seating of said rod end between said two front plates as it swings through the receiver in an arc pattern;
   said trigger mechanism comprising a center support and arcuate arms extending therefrom, each of said arms connected to a ring portion located on the backside of an adjacent front plate, a portion of each of said arms passing through a center of a spring mounted between the back plate and the adjacent front plate; and
   said respective front plate being repositioned to lock said rod end between said front plates until a lever capable of retracting said bracketed rod from said bounded area is actuated.

11. The assembly of claim 10, wherein said rod can be spring loaded.

12. The assembly of claim 10, wherein the bracket further comprises a support bracket mounted thereto in a substantially vertical position.

13. The assembly of claim 10 further comprising a pump handle for a user to engage a portion of said rod in said gate receiver.

14. The assembly of claim 10, wherein said rod is slidable through a support means mountable on said bracket.

15. The assembly of claim 10, wherein said bracket has a two-piece construction and is capable of being partially clamped to a tube, each of said pieces having an angular-shaped portion capable of supporting a portion of said tube in its cleft, one of said pieces further comprising a construction capable of reducing mechanical stress to at least a portion of said tube.

* * * * *